United States Patent
Furuya et al.

Patent Number: 5,825,339
Date of Patent: Oct. 20, 1998

[54] DISPLAY APPARATUS FOR AUTOMOBILES

[75] Inventors: Yoshiyuki Furuya; Kunimitsu Aoki; Tadashi Iino, all of Shizuoka, Japan

[73] Assignee: Yazaki Corporation, Tokyo

[21] Appl. No.: 787,447

[22] Filed: Nov. 4, 1991

[30] Foreign Application Priority Data

Nov. 16, 1990 [JP] Japan ................................ 2-308801

[51] Int. Cl.$^6$ .................................................. G09G 3/00
[52] U.S. Cl. ........................ 345/8; 359/438; 359/833; 340/980
[58] Field of Search .................. 340/705, 980; 359/630, 619, 621, 623, 638, 618, 13, 838, 601, 831, 833, 837, 438; 345/8–10

[56] References Cited

U.S. PATENT DOCUMENTS

| | | | |
|---|---|---|---|
| 2,750,833 | 6/1956 | Gross | 359/601 |
| 4,986,631 | 1/1991 | Aoki | 359/438 |
| 5,005,009 | 4/1991 | Roberts | 359/630 |
| 5,013,134 | 5/1991 | Smith | 340/705 |
| 5,161,480 | 11/1992 | Furuya et al. | 359/631 |

FOREIGN PATENT DOCUMENTS

| | | |
|---|---|---|
| 41 04 233 A1 | 8/1991 | Germany . |
| 2 240 855 | 8/1991 | United Kingdom . |

*Primary Examiner*—Lun-Yi Lao
*Attorney, Agent, or Firm*—Armstrong, Westerman, Hattori, McLeland & Naughton

[57] ABSTRACT

The object of the present invention is to eliminate a double image of a display apparatus for automobiles in which an image of displayer is reflected by a transparent reflection plate toward a driver's seat so that the display image for displaying information on the condition of the vehicle such as vehicle speed can be seen as a virtual image. A display apparatus for automobiles according to the present invention comprising: a displayer for emitting display light; a reflection plate having a first surface on a driver's seat side and a second surface on a side opposite to the driver's seat, the display light diagonally falling on the first surface and being reflected on the first surface to be directed to an eye range, a display image of the displayer being recognized from the driver's seat side within a display range on the first surface, at least a portion of the second surface corresponding to the display range of the first surface being diagonally disposed in relation to the first surface.

2 Claims, 3 Drawing Sheets

DISPLAY APPARATUS FOR AUTOMOBILES

BACKGROUND OF THE INVENTION

1. Field of the Invention

The present invention relates to a display apparatus for automobiles in which an image of a displayer is reflected by a transparent reflection plate toward a driver's seat side so that the display image for displaying information regarding the condition of the vehicle such as vehicle speed can be seen as a virtual image.

2. Description of the Related Art

Conventionally, a display apparatus for automobiles is commonly available, which utilizes reflection surfaces for displaying an image at a long distance to increase the speed for recognizing the displayed image.

In this case, since a longer optical path after reflection shows better far-point-display function, as described in FIG. 6, a display apparatus for automobiles has been proposed in which light is reflected on two surfaces so that the optical path of the reflected light is lengthened while reducing the space occupied by the reflected light.

That is, as described with dashed lines in the figure, a display light emitted from a displayer 10 transmits through a reflection plate 20 made of darkish transparent acrylic plate and falls on the total reflection mirror 30 to be reflected by the mirror 30. Then, the light is further reflected by a reflection surface 20A of the reflection plate 20 on a driver's seat side to be directed to the eye range 40. Therefore, when the reflection surface is viewed from the eye range 40, behind the reflection surface of the reflection plate 20 is recognized a virtual display image.

In this case, the recognized virtual image is positioned in the range that the display light is reflected by a reflection surface 30A of the total reflection mirror 30 via the reflection surface 20A to reach the eye range and the virtual image is displayed at a long distance by repeated reflection so that clear displayed image is obtained.

However, in the display apparatus described above having the reflection plate 20 with the reflection surfaces 20A for reflecting the display light, as exemplified in FIG. 5, a ray l, which is emitted from a point of the displayer 10 and is reflected by the total reflection mirror 30 to fall on the reflection plate 20, is further reflected on the surface 20A of the reflection plate 20 on the driver's seat side and a reflection surface 20B of the reflection plate on the displayer side to form rays 1A and 1B as described in the figure. Then, the rays are directed to the eye range 40.

As a result, the virtual image actually recognized is viewed as a double image, degrading the level of visibility and quality of displayed information.

SUMMARY OF THE INVENTION

It is therefore the object of the present invention to eliminate a double image of a display apparatus for automobiles in which an image of displayer is reflected by a transparent reflection plate toward a driver's seat so that the display image for displaying information on the condition of the vehicle such as vehicle speed can be seed as a virtual image. A display apparatus for automobiles according to the present invention comprising: a displayer for emitting display light; a reflection plate having a first surface on a driver's seat side and a second surface on a side opposite to the driver's seat, the display light diagonally falling on the first surface and being reflected on the first surface to be directed to an eye range, a display image of the displayer being recognized from the driver's seat side within a display range on the first surface, at least a portion of the second surface corresponding to the display range of the first surface being diagonally disposed in relation to the first surface.

In the display apparatus for automobiles according to the present invention, of the display light falling on the display range of the reflection plate, those transmitting the front surface and being reflected on the inner rear surface of the reflection plate transmit the front surface to be directed to the driver's seat. The part of the display light has an optical path different from that of another part of the display light, which is reflected on the front surface of the reflection plate to be directed to the eye range. As a result, only display light reflected on the front surface is viewed from the eye range.

BRIEF DESCRIPTION OF THE DRAWINGS

The present invention will be more apparent from the ensuring description with reference to the accompanying drawing wherein.

DETAILED DESCRIPTION OF PREFERRED EMBODIMENTS

Figure 1:
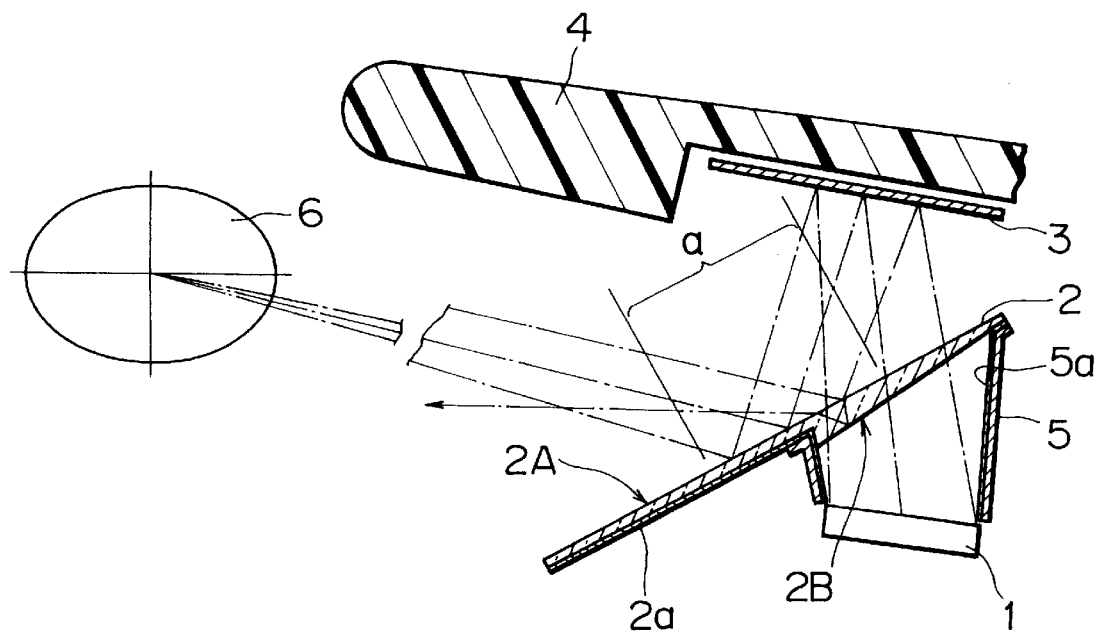
FIG. 1 shows a display apparatus for automobiles according to a first embodiment of the present invention.

FIG. 1 shows a display apparatus for automobile according to one embodiment of the present invention. In the figure,the apparatus includes a self-illuminating-type displayer 1 such as a liquid crystal display apparatus and a fluorescent display tube for displaying information on vehicle driving condition such as car speed, a reflection plate 2 made of darkish transparent smoked acrylic plate, a total reflection mirror 3 having a total reflection surface opposed to the reflection plate 2, a meter hood 4 integrally formed with an instrument panel, 5 a case body 5 having a shape of hollow square pillar for enclosing the circumference of the displayer 1 and a portion of the rear surface of the reflection plate 2, inner surface of the case body being formed a non-reflection treatment layer 5a. The displayer 1, reflection plate 2, total reflection mirror 3, and case body 5 are installed in the instrument panel.

The reflection plate has the reflection surface 2A on the eye range 6 side thereof and a biased surface 2B, which is a portion enclosed by the case body 5 on the rear surface opposing the reflection surface 2A. Further, on the rear surface excluding the biased surface 2B is formed a black treatment layer 2a.

Dashed lines in FIG. 1 represent rays which are emitted from the both ends and the center of the displayer 1 and finally reach the eye range 6. The display light emitted from the displayer 1 (radiated light for display) falls on the biased surface 2B and transmits the reflection plate 2 to be further reflected on the total reflection mirror 3, which is directed to the reflection plate 2 again.

Then, the display light reflect ed on the reflection surface 2A of the reflection plate 2 is directed to the eye range 6. When the reflection surface 2A is viewed from the eye range 6, a virtual image is recognized in a display range a within the reflection surface 2A. Further, repeated reflection caused by the total reflection mirror 3 and the reflection plate 2 provides remote display.

In this case, rays falling on the reflection plate 2 are separated into rays directed to the eye range 6 after being reflected on the reflection surface 2A, and rays transmitting the reflection surface 2A while refracting at the surface. Of the rays refracting and transmitting the surface, those entering the black treatment layer 2a are not reflected since they are absorbed by the black treatment layer 2a. Further, of the rays refracting and transmitting the surface, those entering the biased surface 2B are reflected on the biased surface 2B and refract and transmit the reflection surface 2A.

Figure 2:
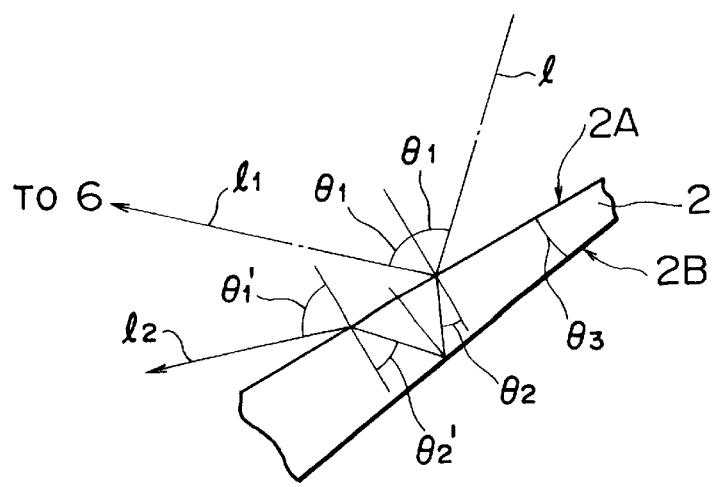
FIG. 2 show s traveling path of rays reflected on a reflection surface and a biased surface in the first embodiment.

FIG. 2 shows traveling path of rays reflected on a reflection surface 2A and entering a biased surface 2B. A ray 1 from the total reflection mirror 3 enters the reflection surface 2A at an incident angle $\theta_1$ and a part of the rays transmits the surface and refract at the angle $\theta_2$ on the reflection surface 2A. The biased surface 2B opposes the reflection surface 2A with an angle between those surfaces $\theta_3$.

Therefore, the ray transmitting the reflection surface 2A and refracting at the angle $\theta_2$ is reflected on inner biased surface 2B and the incident angle $\theta_2'$ thereof when the reflected ray falls on inner reflection surface 2A again becomes larger than the refracting angle $\theta_2$ at the reflection surface 2A. Further, the refracting angle $\theta_1'$ of the ray falling on the reflection surface 2A at the incident angle $\theta_2'$ and refracting and transmitting the reflection surface 2A becomes larger than the reflection angle $\theta_1$ at the reflection surface 2A.

That is, the ray 11 coming from the total reflection mirror 3 and being directed through the reflection surface 2A toward eye range 6 and the ray 12 reflected on the biased surface 2B, transmitting the reflection surface 2A, and refracting there, are directed in different directions each other. The ray 12 is directed in the direction beside the eye range 6.

Therefore, when the reflection surface is seen from eye range 6, light reflected on the biased surface 2B is not recognized and only light reflected on the reflection surface is recognized.

As a result, a double image of the display image within the display range a is eliminated, providing a display image with better visibility and quality.

Figure 3:
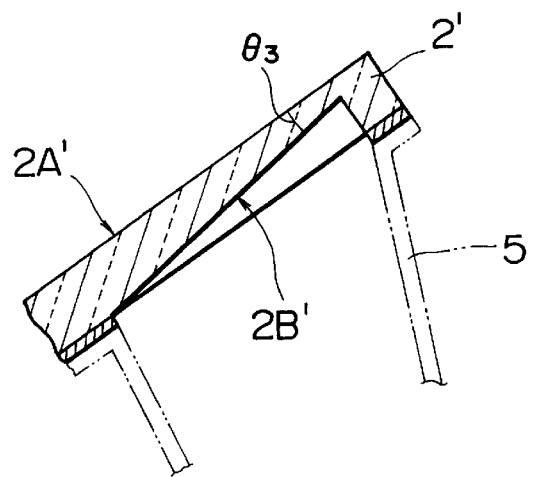
FIG. 3 shows a reflection plate according another embodiment.

In the above embodiment, the reflection plate 2 is formed in such a manner that the biased surface 2B is formed as a slightly projecting portion in an opening of the case body 5. However, like a reflection plate 2' shown in FIG. 3, as an example, a portion of the reflection plate corresponding to the opening of the case body 5 may be depressed to form a biased surface 2B' having the angle $\theta_3$ in relation to the reflection surface 2A.

In FIG. 2, the refracting angle $\theta_2$ is determined in accordance with the incident angle $\theta_1$ of the ray falling on the reflection surface 2A from the total reflection mirror 3 and the refractive index of the reflection plate 2. Further, the incident angle $\theta_2'$ of the ray entering the reflection surface 2A after reflected on the biased surface 2A is determined in accordance with the refracting angle $\theta_2$ and the angle $\theta_3$ of the biased surface 2B. The refracting angle $\theta_1'$ of the ray which transmits the reflection surface 2A and refracts to go out is determined according to the incident angle $\theta_2'$ of the ray falling on the reflection surface 2A from the biased surface 2B and the refractive index.

Therefore, the angles $\theta_1'$ and $\theta_2'$ are determined in accordance with the incident angle $\theta_2'$ of the ray falling an the reflection surface 2A from the total reflection mirror 3, the angle $\theta_3$ Of the biased surface 2B, and the refractive index of the reflection plate 2 .

In this embodiment, $\theta_1'$ is determined according to the angles $\theta_1$ and $\theta_3$, and the refractive index, in consideration of the condition of the automobile such as the position of the eye range, the height of the driver's seat and the position of the display apparatus itself, As an example, where $\theta_1$ is 50.5°, the distance between the reflection surface 2A and eyellipse (which covers 99% of eye ranges of driveres) 800 mm, the refractive index 1.5, 5° is sufficient as the angle $\theta_3$ to prevent double image.

Meanwhile, when the angles $\theta_1$ and $\theta_3$, and the refractive index are determined so that the incident angle $\theta_2'$ of the ray entering the reflection surface 2A after reflected on the biased surface 2B is equal to or more than a critical angle, the reflection surface 2A becomes a total reflection surface, which prevents a double image even when seen from a position beside the view field.

Figure 4:
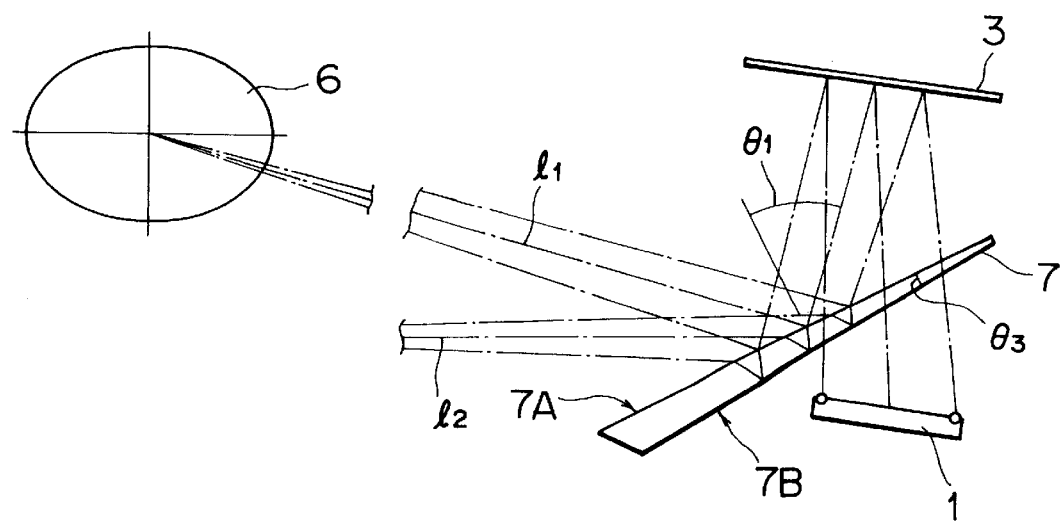
FIG. 4 shows a display apparatus for automobiles according to a second embodiment of the present invention.
Figure 5:
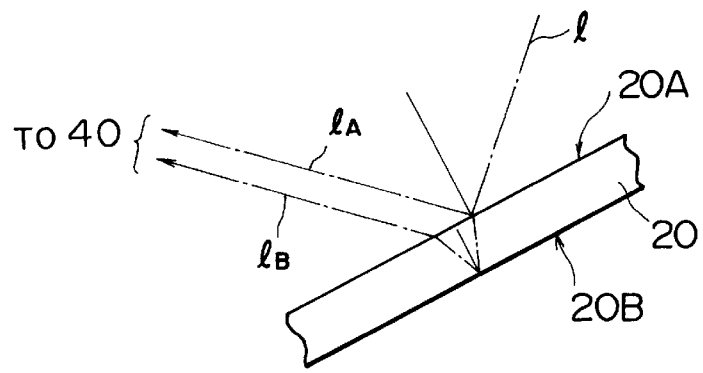
FIG. 5 is a drawing for explaining a double image of a conventional reflection plate.
Figure 6:
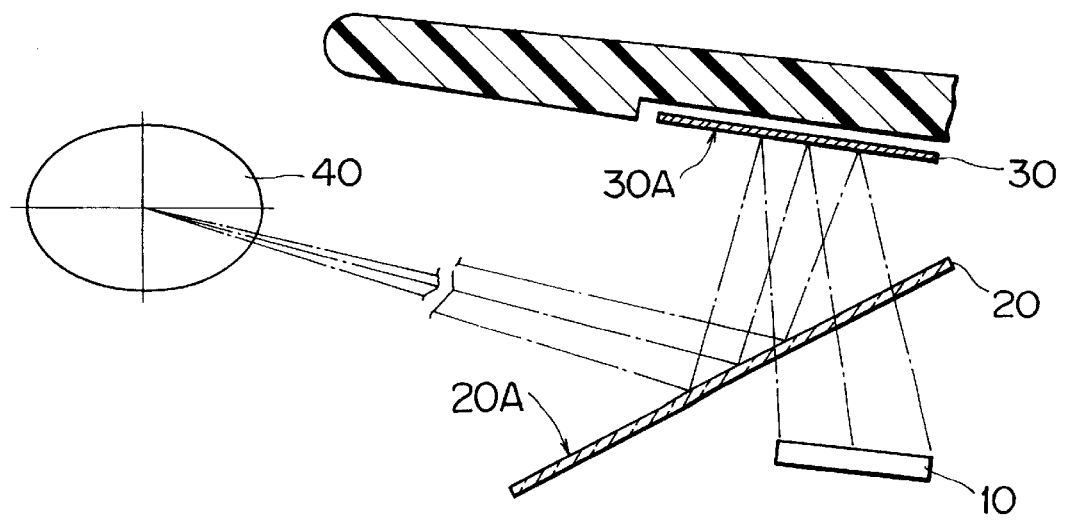
FIG. 6 shows a conventional display apparatus for automobiles.

FIG. 4 shows a display apparatus for automobiles according to a second embodiment of the present invention. In the figure, only optical elements such as a displayer 1, a total reflection mirror 3, a reflection plate 7 are illustrated.

The reflection plate 7 according to the embodiment is formed like an edge. The angle between the reflection surfaces 7A and 7B, and the incident angle $\theta_1$ of the ray falling on the reflection surface 7A from the total reflection mirror 3 are determined so that an optical path 12 reflected on the reflection surface 7B does not reach the eye range 6 and only an optical path 1 reflected on the reflection surface 7A is directed to the eye range 6.

Therefore, in the above embodiment, as in the first embodiment, a double image of the display image is not generated.

Meanwhile, in each of the above embodiments, the display light is reflected twice. However, a double image can be eliminated even when the displayer is installed at the position of the total reflection mirror 3.

As described above, in the display apparatus for automobiles according to the present invention in which a display light emitted from the displayer diagonally falls on the transparent reflection plate and the display light is reflected by the surface of the plate on the driver's seat side toward the eye range of the driver, so that the display image of the displayer is able to be recognized from the driver's seat, within an area of the reflection plate, at least a portion of a rear surface of the reflection plate opposing the front surface and corresponding to the area of the reflection plate is diagonally disposed relating to the front surface of the reflection plate. As a result, only light reflected on the front surface of the reflection plate is to be directed to the eye range, preventing a double image from being recognized.

What is claimed is:

1. A display apparatus for automobiles comprising:
 a displayer for emitting display light; and
 a reflection plate having a first surface on a driver's seat side and a second surface on a side opposite to said driver's seat, said display light diagonally falling on said first surface and being reflected on said first surface to be directed to an eye range, a display image of said displayer being recognized from said driver's seat side within a display range on said first surface, at least a portion of said second surface corresponding to said display range of said first surface being diagonally disposed in relation to said first surface, wherein said display light diagonally falling on said second surface is reflected in a direction other than toward the eve range.

2. A display apparatus for automobiles as claimed in claim 1, wherein said displayer is installed behind said reflection plate in relation to said driver's seat side and a reflection member is installed at a position opposing said displayer while said reflection plate being positioned between said reflection member and the displayer, whereby a display light falling on said reflection member is reflected on said reflection member so as to diagonally enter said first surface of said reflection plate.

* * * * *